US00RE35048E

United States Patent [19]

Rudibaugh

[11] E Patent Number: Re. 35,048

[45] Reissued Date of Patent: Oct. 3, 1995

[54] MEAT EMULSIFYING AND PROCESSING SYSTEM

[75] Inventor: C. Richard Rudibaugh, Denver, Colo.

[73] Assignee: Cozzini, Inc., Chicago, Ill.

[21] Appl. No.: 205,588

[22] Filed: Mar. 2, 1994

Related U.S. Patent Documents

Reissue of:

[64] Patent No.: 5,092,528
Issued: Mar. 3, 1992
Appl. No.: 319,806
Filed: Mar. 6, 1989

U.S. Applications:

[63] Continuation of Ser. No. 100,472, Sep. 24, 1987, abandoned.

[51] Int. Cl.[6] ..... B02C 18/30; B02C 23/02; B02C 25/00

[52] U.S. Cl. ..... 241/65; 241/34; 241/82.2; 241/82.5

[58] Field of Search ..... 241/82.5, 285.1, 241/285.2, 65, 66, 37.5, 82.1, 82.2, 82.3, 82.4, 82.6, 82.7, 34; 99/472, 486; 366/51

[56] References Cited

U.S. PATENT DOCUMENTS

| | | |
|---|---|---|
| 3,050,399 | 8/1962 | Kielsmeier et al. . |
| 3,095,022 | 6/1963 | Schmook, Jr. . |
| 3,107,392 | 10/1963 | Schmook, Jr. . |
| 3,166,784 | 1/1965 | Millenaar et al. . |
| 3,170,797 | 2/1965 | Sloan et al. . |
| 3,373,783 | 3/1968 | Spangler . |
| 3,599,556 | 8/1971 | Madsen . |
| 3,605,836 | 9/1971 | Schnell . |
| 3,908,537 | 9/1975 | Bajcar et al. . |
| 3,992,985 | 11/1976 | McFarland . |
| 4,303,205 | 12/1981 | Geiger et al. . |
| 4,327,871 | 5/1982 | Larsen . |
| 4,382,404 | 5/1983 | Hawley et al. . |
| 4,479,614 | 10/1984 | Bernard . |
| 4,643,584 | 2/1987 | Allocca . |
| 4,700,899 | 10/1987 | Powers et al. . |
| 4,714,203 | 12/1987 | Williams . |
| 4,747,342 | 5/1988 | Schack et al. . |

FOREIGN PATENT DOCUMENTS

| | | |
|---|---|---|
| 1241065 | 5/1967 | Germany . |

*Primary Examiner*—Joseph M. Gorski
*Attorney, Agent, or Firm*—Lee, Mann, Smith, McWilliams, Sweeney & Ohlson

[57] ABSTRACT

A meat emulsification system for producing meat products with optimum emulsification stability. The emulsification system includes a perforated plate and a rotary multibladed cutter disposed adjacent an upstream side thereof which is operable for breaking the meat into a fine emulsion and raising the temperature thereof as it is directed through the perforated plate. Meat to be emulsified is fed to the emulsifying mill by a positive displacement pump which creates a positive pressure at the inlet of the mill and which can be varied in order to control the through put of the mill, and thus, the temperature rise of the product discharged from the mill for achieving optimum emulsification stability in the processed product. The emulsification system permits the use of a perforated plate with smaller sized apertures and a rotary cutter with greater numbers of blade carrying arms than heretofore possible for producing a finer and more cohesive emulsion, while yet permitting relatively precise control of the temperature rise during emulsification. The mill further includes a two part housing which may be readily opened in order to permit cleaning and servicing of the internal components of the mill.

6 Claims, 6 Drawing Sheets

MEAT EMULSIFYING AND PROCESSING SYSTEM

Matter enclosed in heavy brackets [ ] appears in the original patent but forms no part of this reissue specification; matter printed in italics indicates the additions made by reissue.

This is a continuation of my application Ser. No. 100, 472, filed Sept. 24, 1987, now abandoned.

DESCRIPTION OF THE INVENTION

The present invention relates generally to a meat emulsifying and processing system of the type in which ground or chopped meat is delivered to an emulsifying mill, is broken into a fine emulsion, and then is delivered from the mill to a stuffer or the like. Such systems are conventionally used in the processing of sausage, bologna, frankfurters, poultry, fish and similar products in order to reduce the meat content such meat products into a cohesive emulsion which may be stuffed into an outer casing.

Most commercially available meat emulsifying mills employ a high speed rotary cutter which force meat and fat products, and added water, through a perforated plate for breaking the product into relatively fine particles, blending the product into a homogeneous mixture, and raising the temperature of the product sufficient that the protein from the meat cells is released and partially denatured thereby acting to bond the product together so as to enable the product to retain fat and moisture upon cooking. Under the optimum temperature conditions this partially denatured protein forms a stringy, coagulum matrix trapping the meat particles and resulting in the optimum retention of fat, water and meat particles in the emulsion product. For economy of production, it is desirable that the final product contain as much fat and added water as possible while still meeting government specifications. It also is desirable to use the least cost formulation blending for the fat and lean meats.

Emulsion stability is the ability of the finished product to retain fat and added water to a maximum degree upon cooking. If during the emulsification process the temperature of the product is not increased sufficiently to effect the release and partial denaturation of the protein from the meat product, then upon cooking, the fat and moisture will be released from the product, reducing the size of the cooked product and creating an unsightly accumulation of grease and fat about the outside thereof. On the other hand, if during emulsification, the temperature increase is excessive, then the binding cohesive effect of the protein matrix tends to become destroyed, such that upon cooking of the product, fats and moisture are again released. It has been found that as the temperature change effected during emulsification approaches the preferred emulsification temperature for a particular product, increased fat and moisture retention is possible in the final product. As the temperature increases beyond the preferred temperature for such product, fat and moisture retention in the final product is reduced.

In an effort to achieve the desired temperature increase during emulsification, it has been the practice to utilize standardized perforated plates, the aperture size in the plate being selected to most closely result in the desired temperature increase. The smaller the aperture size in the perforated plate, the greater working of the product that is necessary in breaking the product down sufficiently so that it may be forced through the perforated plate, and thus, the greater the temperature increase. Precise temperature control, however, has not been possible. For example, if a standardized perforated plate having 1.7 millimeter diameter apertures is utilized, the temperature increase for a particular product may be only 80% of the preferred amount. If the next smaller standardized perforated cutting plate is used, i.e., one with 1.4 millimeter apertures, due to the greater working of the product necessary to achieve passage through such smaller openings, the temperature may rise to 120% of the optimum. In neither instance, therefore, would maximum emulsion stability be achieved.

Moreover, although it is preferable to emulsify the meat into as fine of particles as possible, for the reasons indicated above, the aperture size in the perforated plate heretofore has been limited by temperature considerations. In practice, perforated plates with apertures of 1.4 millimeters has been about the smallest size that has been permissible. Even then, it is necessary to extensively prechop many meat by products in bowl cutters and to process it through double stage meat grinders prior to reaching the emulsification mill. Such pregrinding of the product requires relatively expensive equipment and additional energy requirements, and as a result, increases the cost of the processing. When relatively tough inexpensive by-products are used, greater preworking of the product is required, and effective emulsification is even more difficult within temperature limitations. Heretofore, it has generally not been possible to emulsify meat products which have been preground only through a single stage meat grinder.

The degree of emulsification further can be a function of the rpm of the cutter in the emulsification mill and the number of cutting blades or knives on the cutter. The cutting blades typically are designed to force the product through the perforated plate of the emulsification mill. While increasing the number of blades on the cutter will enhance the thoroughness and fineness of the cut for a given rpm of the cutter, heretofore, horsepower and temperature limitations have limited the number of blades on the cutter to no more than three.

Furthermore, since the cutting blades in the emulsifier commonly are designed to force the product through the perforated plate, this creates a negative pressure at the inlet side of the mill which tends to introduce air into the product as it is drawn from the feed hopper to the mill. Air in the processed product will allow bacterial growth more rapidly, and thus, reduce the shelf life.

It is an object of the invention to provide an emulsification system that is adapted for more thorough and efficient emulsification of meat by-products.

Another object is to provide an emulsification system as characterized above that is operable to more reliably process emulsified meat products with optimum emulsion stability.

A further object is to provide an emulsification system of the foregoing type which permits more economical emulsification and blending of lessor expensive and tougher meat by-products, while retaining product quality.

Yet another object is to provide an emulsification system of the above kind that permits relatively precise control of the temperature change during emulsification, and thus, better control in the emulsion stability of the processed product.

Still a further object is to provide an emulsification system of such type which permits utilization of a perforated cutting plate in the emulsifier with smaller sized apertures than heretofore possible so as to enable the meat products to be broken down into a finer and more cohesive emulsion. A related object is to provide such an emulsification system which permits efficient emulsification of even relatively tough meat byproducts that have been preground only by passage through a single stage meat grinder.

A further object is to provide an emulsification system which permits the use of a cutter having a greater number of cutting blades than heretofore possible.

Yet another object is to provide an emulsification system which is less susceptible to the introduction of air into the emulsified product and which is operable for more reliably processing emulsified products with good shelf life.

A further object is to provide an emulsification system which lends itself to substantially automated control.

Other objects and advantages of the invention will become apparent upon reading the following detailed description and upon reference to the drawings, in which:

Figure 1:
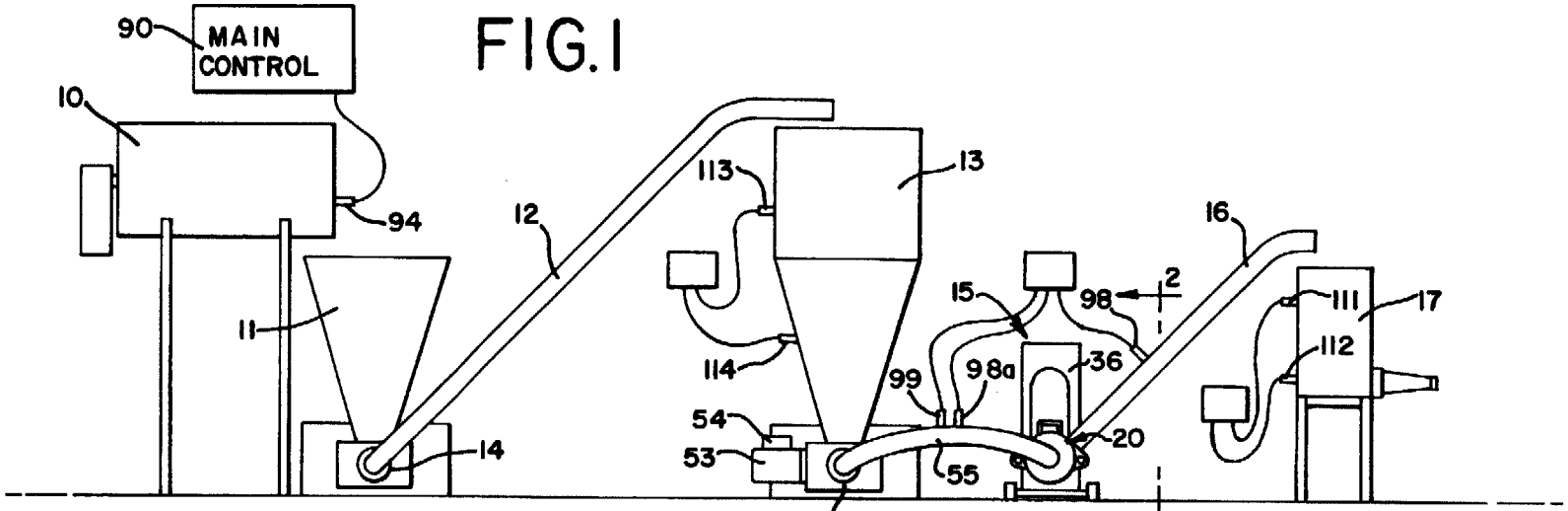
FIG. 1 is a side elevational view of a meat processing system having an emulsifier embodying the present invention.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

Referring now more particularly to FIG. 1 of the drawings, there is shown an illustrative meat processing system 10 adapted for emulsifying various meat products, such as beef, pork, poultry and mixtures thereof, and for stuffing the emulsified product into casings in order to form processed products such as sausage, bologna or frankfurters. The meat processing system 10 includes a mixer 10 into which lean meat, fat, water and condiments are subjected to final mixing and blending prior to emulsification. Final correction of the moisture and fat content of the product may be effected in the mixer 10, as is known in the art. The product entering the mixer 10 is preground or prechopped and a typical product may contain sixty percent (60%) lean meat, thirty percent (30%) fat and ten percent (10%) moisture. As will become apparent, in the system of the present invention, lesser preworking of the product is required than in conventional emulsification mills, such preworking generally being effected only by passage of the product through a single stage meat grinder.

Product from the mixer 10 in the illustrated system is discharged into a transfer hopper 11 and then is pumped upwardly through a chute 12 and into a large supply silo 13 by a positive displacement transfer pump 14 at the lower end of the transfer hopper 11. The product then is delivered to an emulsifying mill 15 which is in the nature of a high speed grinder adapted to break the product down into a very fine cohesive emulsion. Emulsified product from the mill 15 is delivered through a discharge chute 16 to a receiver 17, which in this instance, is a stuffer 17 adapted to inject the material into appropriate casings at high speeds. A typical processing system may be capable of handling about 15,000 pounds of product per hour.

Figure 4:
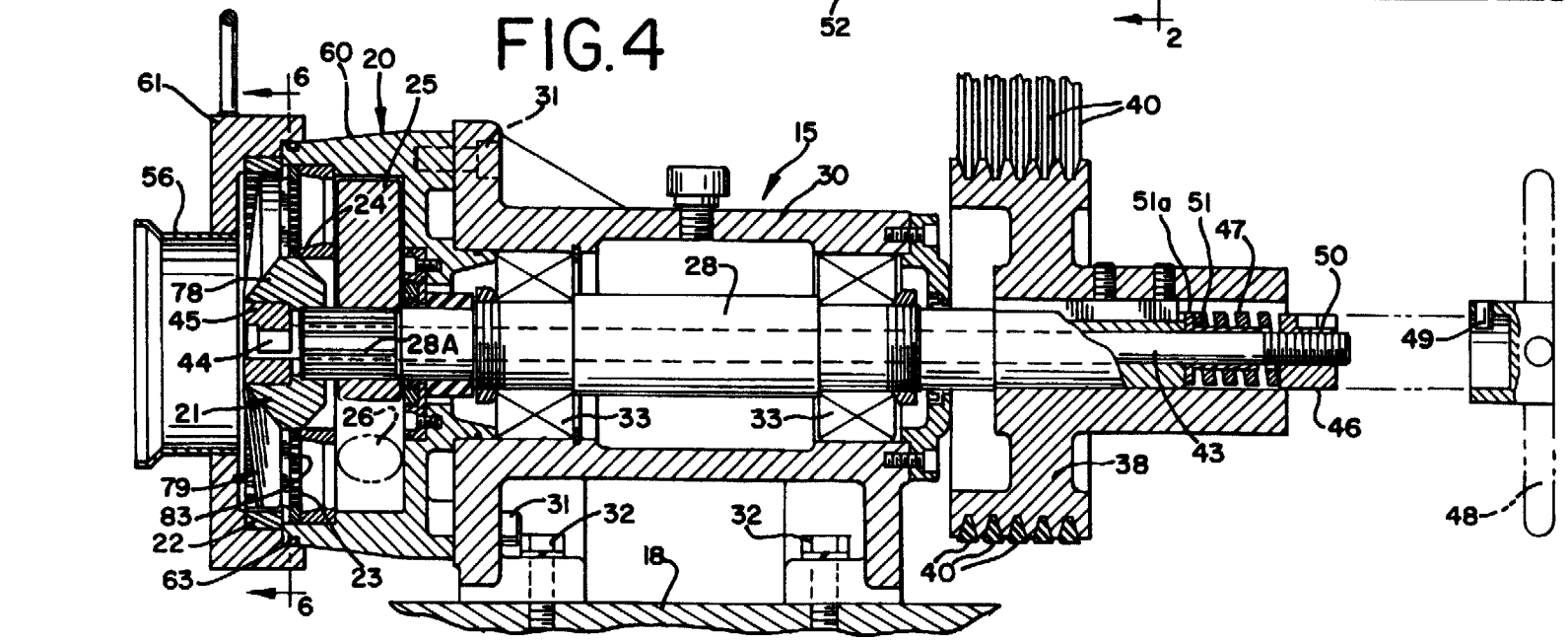
FIG. 4 is an enlarged fragmentary section taken in the plane of line 4—4 in FIG. 3.
Figure 2:
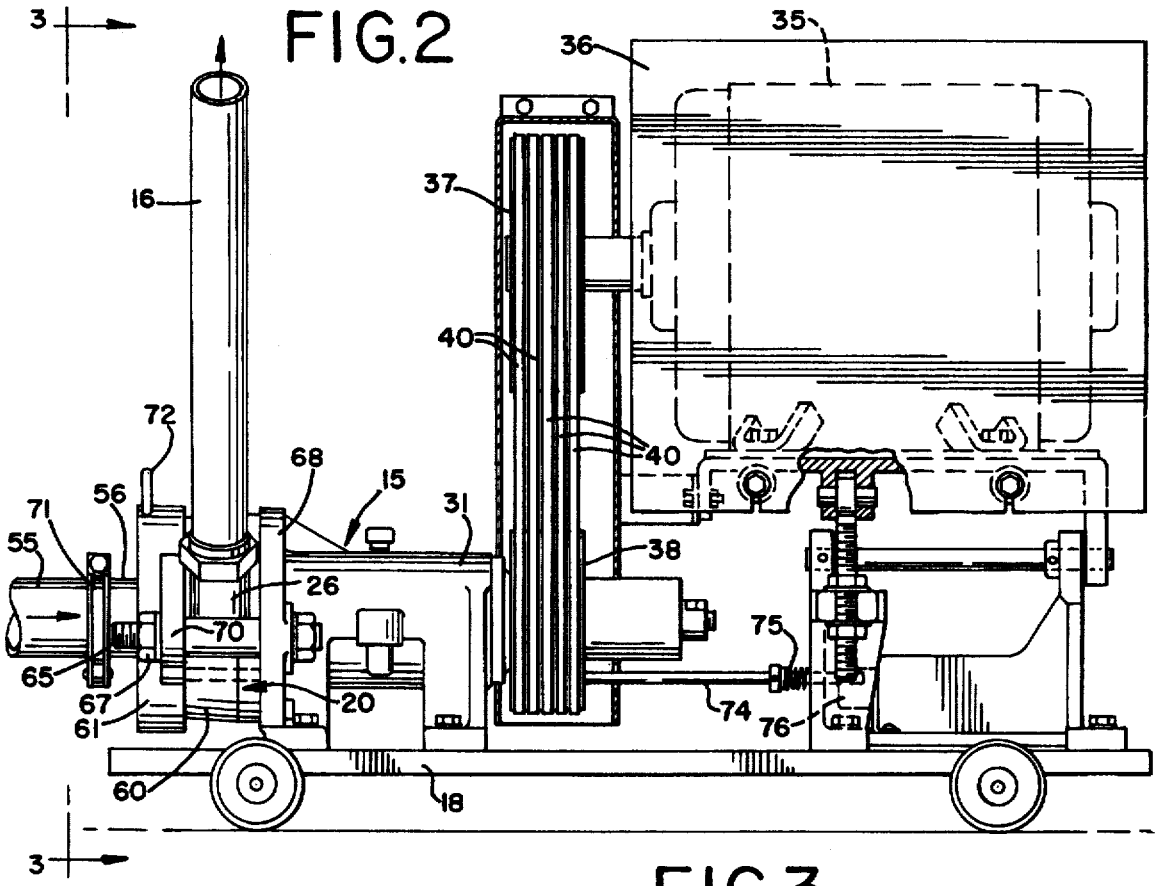
FIG. 2 is an enlarged side elevational view of the emulsifier shown in the illustrated system, taken in the line of 2—2 in FIG. 1, certain parts being broken away and shown in section.

The components of the illustrated emulsification mill 11 are supported on a wheeled cart 18, as best shown in FIGS. 2 and 4. In general, the mill 11 includes a tubular housing 20 (FIG. 4) defining a chamber which contains a rotary cutter 21; a conventional ratchet tooth gristle ring 22 that is stationary; a perforated extrusion or cutting plate 23 which also is stationary; a stationary backing support plate 24 for the cutting plate; and a three-bladed rotary discharge impeller 15 which slings the emulsified product out of an outlet o discharge port 26 in the housing 20 and into the chute 16 for delivery to the stuffer 17. The cutter 21 and the discharge impeller 25 are adapted to be rotated by a tubular shaft 28 having a splined end portion 28A which is telescoped slidably with the cutter. A large sleeve 30 is bolted to one end of the housing 20 at 31 and to the cart 18 at 32 and houses a pair of bearings 33 which rotatably support the shaft 28. For driving the shaft 28, an electric motor 35 (FIG. 2) supported within an enclosure 36 on the cart 18 has a drive pulley 37 operably connected to a driven pulley 38 on the shaft 28 by a plurality of belts 40.

As the cutter 21 is rotated, it co-acts with the forward side of the cutting plate 23 to grind the product finely and to extrude the product through small perforations or apertures 42 (FIG. 8) in the plate. To enable the contact pressure between the cutter and the perforated plate to be adjusted, an elongated draw bar 43 (FIG. 4) extends through the center of the shaft 28 and its forward end portion 44 interlocks with a retaining collar 45 on the cutter. A nut 46 is threaded onto the rear end of the draw 43 and compresses a coil spring 47 against the rear end of the shaft 28. Thus, the spring urges the draw bar from left to right in FIG. 4 and biases the cutter 27 against the perforated plate 23. By adjusting the nut 46 to the left or to the right on the draw bar 43, the force exerted by the spring 47 may be increased or decreased, respectively, to adjust the pressure of the cutter against the plate. Adjustment of the nut may be effected by a removable hand wheel 48 having a key 49 adapted to interlock with a keyway 50 in the nut. For limiting the biasing force of the spring 47 to a predetermined maximum amount, a sleeve 51 is mounted on the shaft and has an outwardly extending annular flange 51A at one end thereof, against which one end of the spring 47 engages (FIG. 4). The opposite end of the sleeve 51 serves to limit threaded movement of the nut 46 onto the shaft 28, and thus limit axial compression of the spring.

As is known in the art, during the emulsification protein is fractured from the meat cells as the product is broken up by the rotating cutter 21 and is forced through the perforations 42 in the plate 23 with a resulting temperature increase. The fractured protein is a glue-like substance that acts to retain fat and moisture in the mixture and to bind the fat, the moisture and the lean meat together as a cohesive mass. As the product is broken up in the mill 15, it inherently experiences an increase in temperature, such as in the range of 15 to 25 degrees F, due to the action of the cutter 21 and the forcing of the product through the apertures 42.

In accordance with the invention, the emulsifier is adapted to more reliably emulsify the meat product to an optimum temperature rise for achieving maximum emulsion stability in the processed product. More particularly, the system of the present invention is adapted to permit relatively precise control over the discharge temperature of the emulsification mill by force feeding the product to the mill under positive pressure and by selectively increasing or decreasing the flow if the discharge temperature rises or falls, respectively, beyond certain target values. To this end, in the illustrated embodiment, force feeding is effected by a positive displacement pump 52 (FIG. 1), such as a gear pump located at the bottom of the supply silo 13 and driven by an electric motor 53 having a variable speed control The discharge side of the pump 52 is connected by a flexible conduit 55 to an inlet pipe 56 (FIGS. 2 and 4) attached to the forward end of the housing 20 and communicating with the chamber defined by the housing.

In contrast to conventional emulsification mills which rely on a gravity feed to the emulsifier, and in which a significant negative pressure is created by the rotating cutter on the upstream side of the perforated plate, the pump 52 in the illustrated system draws product from the silo 13 and positively feeds the product to the mill by way of the conduit 15 and inlet pipe 56. The positive force feed is at a controllable flow rate, as determined by the speed of the pump 52, which in turn permits control of the temperature rise during emulsification. For example, if the temperature of the product discharging from the emulsifier rises above the predetermined target value for achieving optimum emulsification stability for a particular product, the speed of the pump can be increased in order to force more product through the mill in a given period of time, and thereby, shorten the time the product is in the mill. This produces a smaller temperature rise in the product passing through the mill and enables the discharge temperature to be lowered. On the other hand, if the discharge temperature is below the preferred or critical value, the speed of the pump 52 may be reduced to enable the product to remain in the mill for a longer period of time, and thereby, be more thoroughly emulsified through optimum protein release and partial denaturation.

Figure 5:
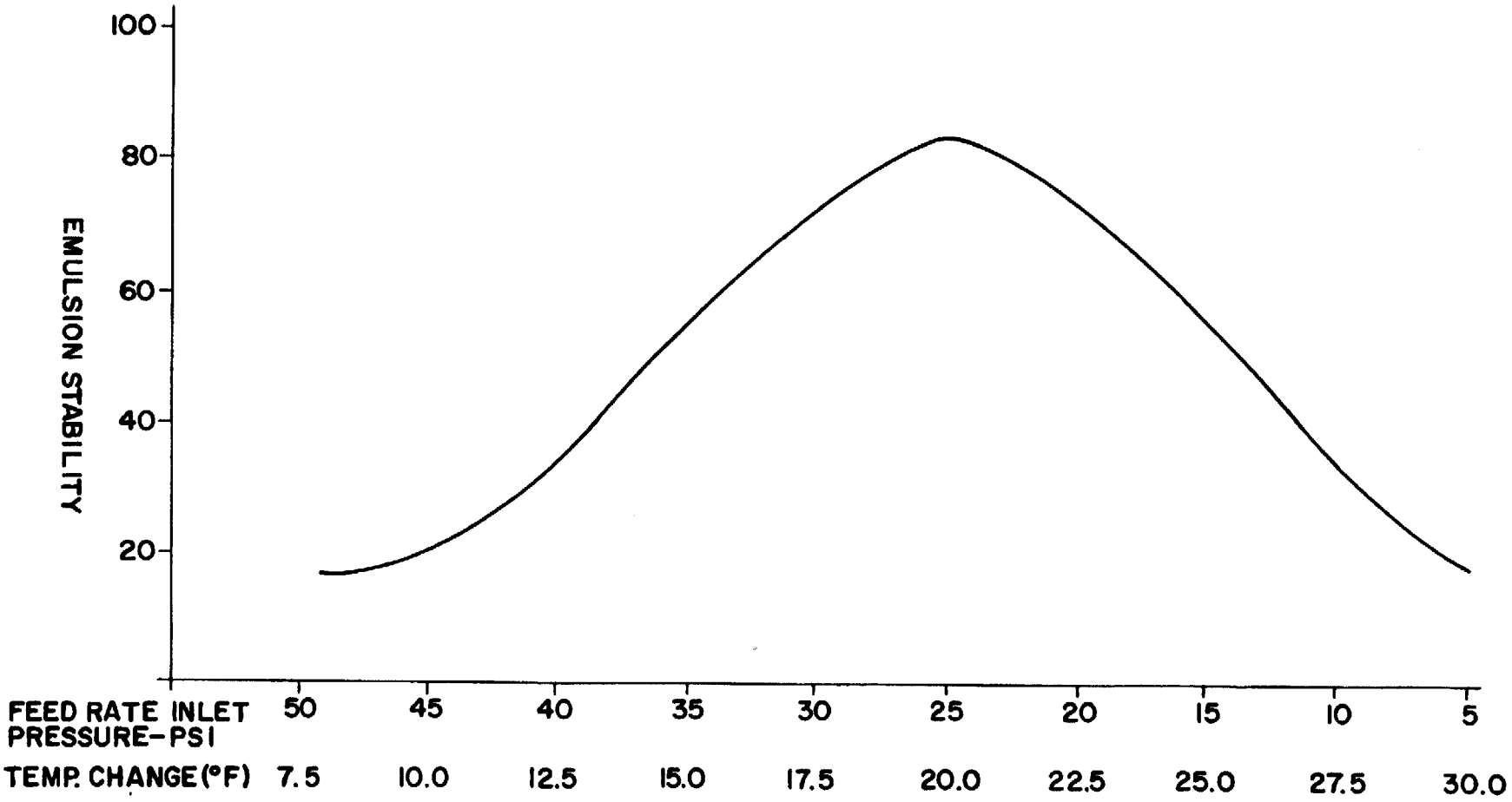
FIG. 5 is a chart depicting the temperature pressure versus emulsion stability for a typical emulsified product.

The relation of the temperature rise during emulsification to the emulsion stability in the final product is illustrated by reference to the chart shown in FIG. 5. At the outset, for a particular product, the desired temperature rise for achieving optimum emulsion stability can be closely estimated or determined. From FIG. 5, it can be seen that the temperature increase during emulsification is a function of the feed inlet pressure. In the illustrated example, the optimum emulsion stability is achieved by a 20° F. temperature increase during emulsion, which can be effected by maintaining an inlet feed pressure of about 25 psi. In the event the temperature increases above 20° F., which can be determined through a temperature sensor 98 at the outlet of the emulsion mill, the speed of the pump 52 may be increased so as to increase the inlet feed pressure and the through put of the emulsification mill. In the event the temperature rise falls below the predetermined 20° F., the pump 52 may be slowed, thus lowering the inlet feed pressure and mill through put, so as to again achieve the desired temperature increase and optimum emulsion stability in the processed product.

It will be understood by one skilled in the art that the speed of the pump 52 may be adjusted in various ways as, for example, by changing the setting of the variable speed control 54 of the motor 53. The motor may have an electronic speed control, such as the control 54, or alternatively, the pump and the motor may be connected by a pulley and belt drive having variable diameter pulleys which may be adjusted to change the speed of the pump relative to the speed of the motor.

In keeping with the invention, the emulsifier of the present invention is adapted to utilize a cutting plate 23 with smaller diameter perforations 42 than heretofore possible, and thus, achieve finer cutting during emulsification and a more cohesive emulsion. By force feeding the product into the mill by the pump 52, it has been found possible to utilize apertures 42 in the cutting plate as small as 1.0 millimeter. Conventional emulsifiers, in contrast, have been unable to effectively operate with perforated plates having apertures smaller than about 1.4 millimeters, which have nearly twice the cross sectional area. While not fully understood, it is believed that because of the positive pressure at the inlet of the emulsifying mill generated by the pump 52 the product tends to be physically forced through the relatively small apertures, resulting in finer emulsification than previously possible while still operating within acceptable temperature limitations.

Moreover, because a positive pressure is maintained at the inlet of the mill, there is less tendency for air to be drawn into the emulsified product, as compared to conventional emulsification mills. Hence, there is less likelihood of premature promotion of bacterial growth in the processed product and shortening of shelf life. In addition, the emulsifier of the present invention has been found to enable effective emulsification of many relatively tough, inexpensive meat by-products, which heretofore have been difficult and more costly to emulsify. Emulsification of such by-products can be achieved in the present system with minimal preworking, typically only requiring passage of the product through a single stage meat grinder, again in contrast to conventional emulsification systems which require extensive bowl cutting and multi-stage pregrinding.

It has been found that the emulsification system of the present invention can be operated with significant cost savings over conventional systems, utilizing least cost blending fat and lean meat products and operating with more efficient power consumption. One specific installation constructed in accordance with the invention, for example, employed a 100 horsepower motor 35 for driving the mill 15 and a 10 horsepower motor 53 for driving the pump 52, and was found to operate with the same capacity as a gravity feed system having a 125 horsepower motor for driving the mill and a 200 horsepower motor for operating a bowl chopper to prework the product prior to emulsification, resulting in a total horsepower requirement of 325 horsepower.

Figure 7:
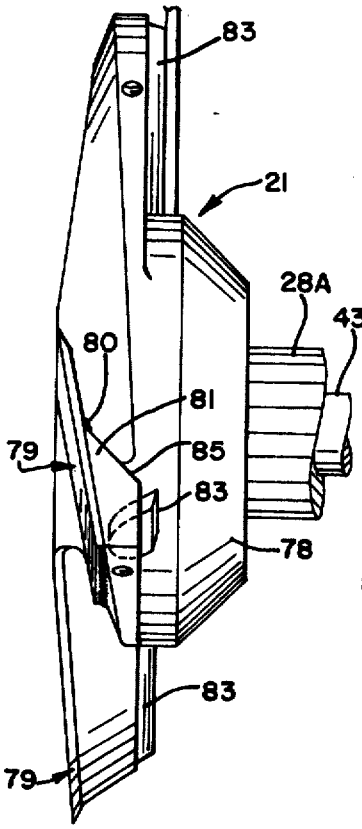
FIG. 7 is an elevational view of the cutter shown in FIG. 6.
Figure 6:
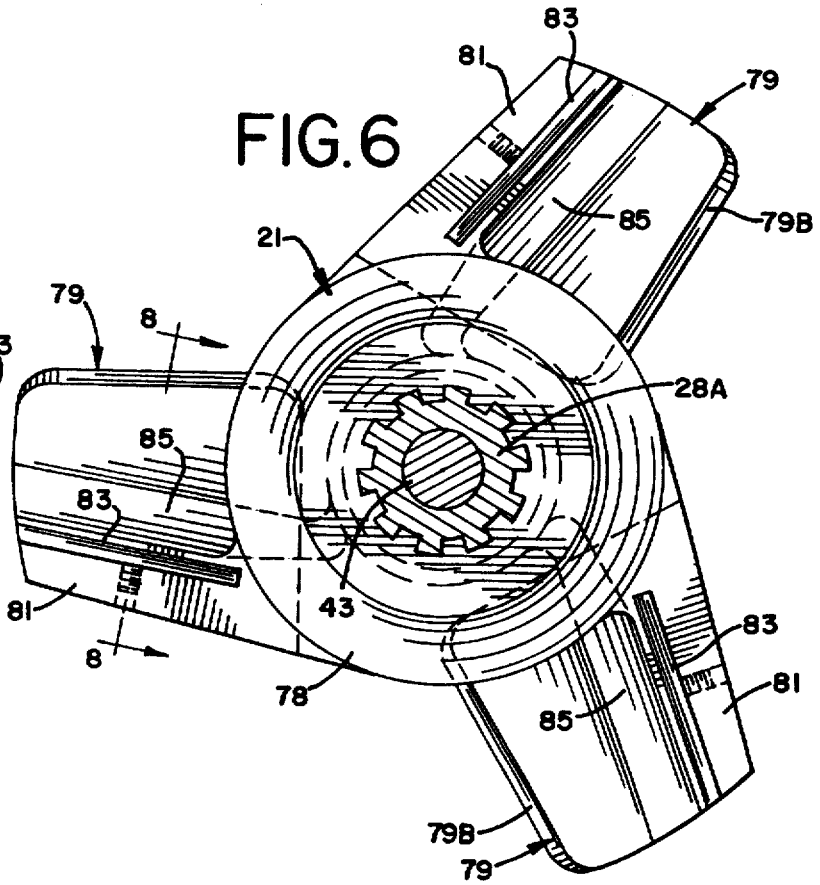
FIG. 6 is an enlarged section taken in the plane of line 6—6 in FIG. 4 and showing the rotary cutter of the emulsifier.
Figure 8:
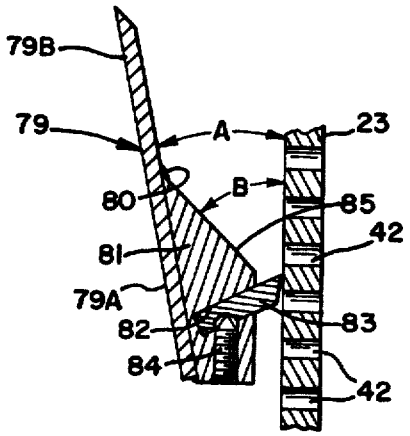
FIG. 8 is a fragmentary section taken in the plane of line 8—8 in FIG. 6.

In carrying out the invention, the cutter 21 in this instance is configured so as to enhance emulsification of stiff and cold product, by assisting in forcing the product through the perforated cutting plate 23. The illustrated cutter 21, as shown in FIGS. 6–8, includes a central body or hub 78 which receives the splined end portion 28A of the shaft 28 and is adapted to be rotated in a clockwise direction, as viewed in FIG. 5. Three blade holding wings 79 are spaced angularly around and are welded rigidly to the hub. Each wing is inclined such that its downstream face is at an acute angle A of about 15 degrees relative to the upstream face of the perforated cutting plate 23. Welded at 80 (FIG. 8) to the downstream face of the trailing edge portion 79A of each wing 79 is a blade holder 81 formed with a slot 82 which receives a cutting blade 83. Each cutting blade is secured in its slot by a set screw 84 located in a tapped hole in the blade holder 81 which acts to clamp the blade in the slot.

As shown in FIG. 8, each blade holder 81 is formed with an inclined downstream face 85 that is located at an acute angle B of about 45 degrees relative to the upstream face of the perforated plate 23. Each wing 79 includes a leading edge portion 79B that extends well beyond the face 85 and is inclined at the angle A. When the cutter 21 is rotated clockwise, the inclined leading edge portions 79B of the wings 79 make a relatively wide initial cut through the product and force the product against the differently angled faces 85 which then push the product against the plate 23 for shearing by the blade 83. Being extended beyond the inclined faces 85 of the blade holders 81 and being inclined at a substantially smaller angle than the faces 85, the leading edge portions 79B of the wings 79 produce a relatively wide cut, enabling a comparatively large quantity of product to be forced through the plate 23 in a given period of time so as to increase the through put capacity of the mill 18. Since the product is being force feed to the cutter by the pump 52, there is no opportunity for air to be drawn into the emulsified product, as in the case of conventional emulsifiers which create significant negative pressures upstream of the cutter blade.

Figure 9:
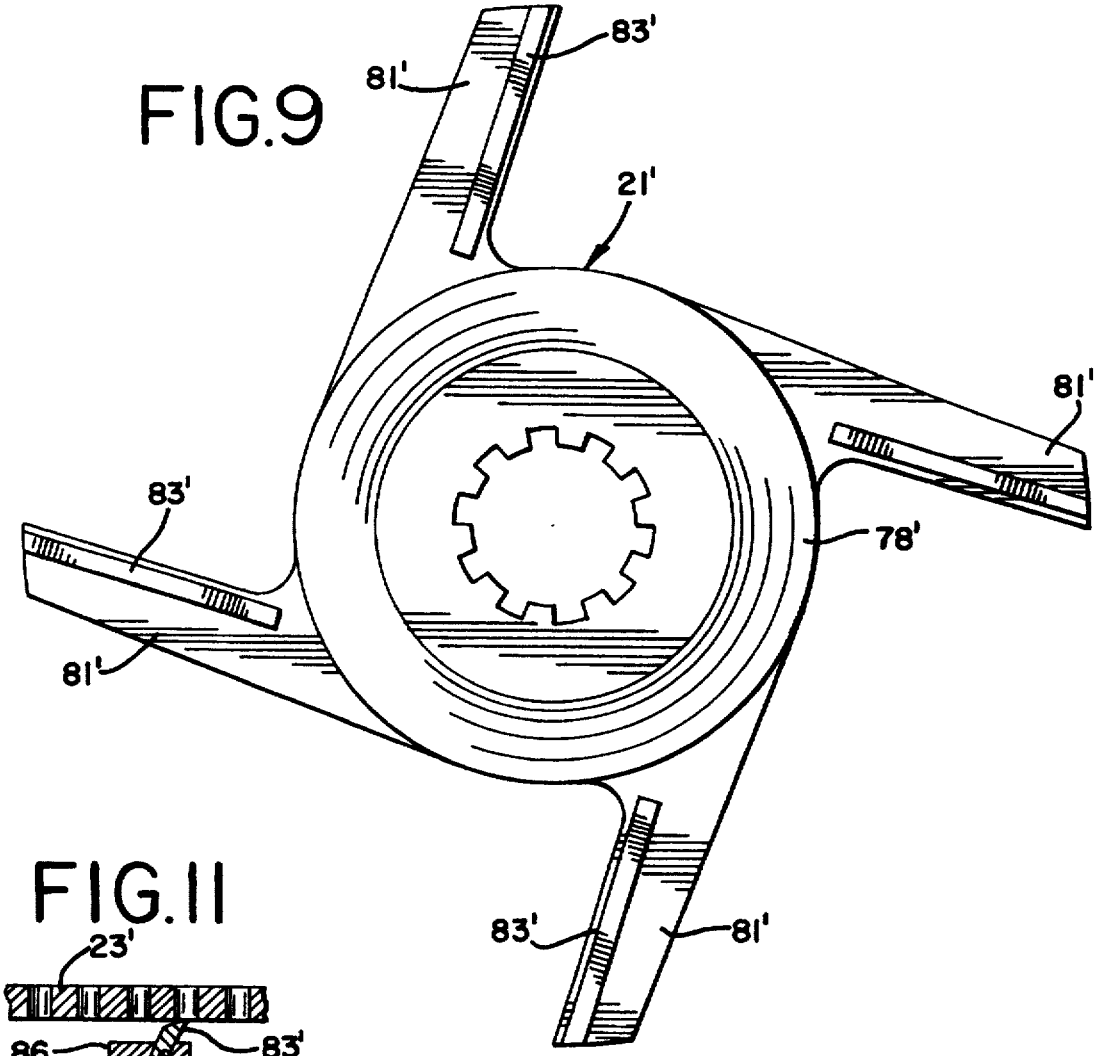
FIG. 9 is an enlarged section of an alternative form of rotary cutter adapted for use in the illustrated emulsifier.
Figure 11:
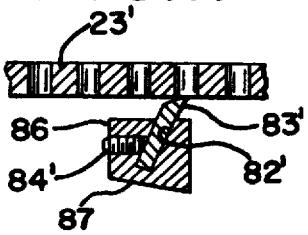
FIG. 11 is a fragmentary section taken in the plane of line 11—11 in FIG. 10.
Figure 10:
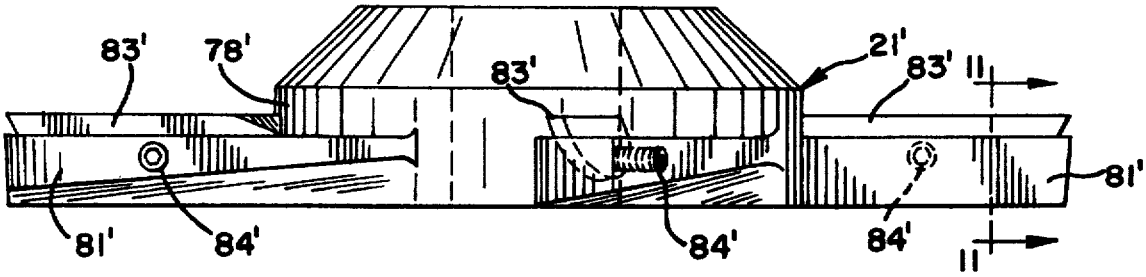
FIG. 10 is an elevational view of the cutter shown in FIG. 9.

Referring now to FIGS. 9–11, there is shown an alternative embodiment of cutter for use in the emulsification mill, wherein pans similar to those described above have been given similar reference numerals with a distinguish prime added. The cutter 21' in this instance has a greater number of blade carrying arms, as compared to cutters used in conventional emulsifiers, so as to significantly increase cutting action during emulsification. The illustrated cutter 21' has a hub 78' with four blade carrying arms 81' extending outwardly therefrom in tangential relation to the hub 78', although it will be appreciated that even a greater number of arms could be utilized. The arms 81' in this instance each have a substantially rectangular cross section, as illustrated in FIG. 11, with a forward face 86 disposed in substantially parallel relation to the upstream face of the cutting plate 23', such that upon rotation of the cutter 21' the arms exert no significant forward pressure, or pumping action, against the product in the mill. Each arm 81' carries a cutting blade 83' that is received within a slot 82' with the cutting blade extending outwardly thereof in angled relation to the forward face of the arm. An appropriate set screw 84' mounted in a tapped hole in the arm secures the cutting blade in place.

It will be appreciated that for a given rpm, the cutter 21' will effect 25% more cuts per revolution than a conventional three bladed cutter operated at the same speed. Moreover, since the cutter 21' does not have to force feed the product through the cutting plate 23' power to the cutter it is not consumed for the purpose. As a result, it has been found that a four bladed cutter 21' may be operated at substantially the same rpm as conventional three bladed cutters, to achieve significantly greater cutting action, with no greater horse power requirements. Since through put of the product is effected primarily by the pump, it still is possible to maintain relatively precise control of the temperature rise during emulsification, and thus emulsion stability, even when using a cutter plate with perforations of 1.0 millimeter in diameter and less.

In accordance with a further more detailed aspect of the invention, the housing 20 of the mill 15 is formed by two separate tubular sections 60 and 61 (FIGS. 2 and 4) which may be easily disassembled to enable the operating components of the mill to be cleaned, repaired or replaced. The housing section 60 in this instance is a downstream section secured by the screws 31 to the sleeve 30. The downstream housing section 60 surrounds the perforated plate 23, the backing plate 24, and the discharge impeller 25. The housing section 61 is an upstream section that surrounds the cutter 21 and the gristle ring 22 and supports the inlet pipe 56.

The upstream forward housing section 61 normally is telescoped over the downstream housing section 60 and is sealed thereto by an O-ring 63, as shown in FIG. 4. The two housing sections normally are locked together by a pair of bolts 64 and 65 (FIG. 3) and a pair of nuts 66 and 67. The bolt 64 extends through a flange 68 (FIGS. 2 and 3) on the downstream housing section 60 and an ear 69 (FIG. 3) on the upstream housing section while the bolt 65 extends through the flange 68 and a diametrically spaced hook-like ear 70 on the upstream housing section. When tightened, the nuts 66 and 67, respectively, clamp the ears 69 and 70 to the flange 68 and thereby lock the two housing sections in telescoping relation as shown in FIG. 4.

When it is necessary to service the mill 15, the supply conduit 55 is released from the inlet pipe 56 by loosening a clamp 71 (FIGS. 2 and 3) which normally secures the conduit to the pipe. Thereafter, the nuts 66 and 67 are loosened on the bolts 64 and 65 to enable the upstream housing section 61 to be pulled out of telescoping relation with the downstream housing section 60 by means of a ball-type handle 72 on the upstream housing section. The handle then may be used to swing the upstream housing section 61 about the bolt 64 and to an open position relative to the downstream housing section 60 as shown in phantom lines in FIG. 3, the hook-like ear 70 releasing the bolt 65 to permit such swinging. With the upstream housing section 61 in its open position, there is free access to all of the components in both housing sections so as to enable convenient cleaning and servicing of such components.

Figure 3:
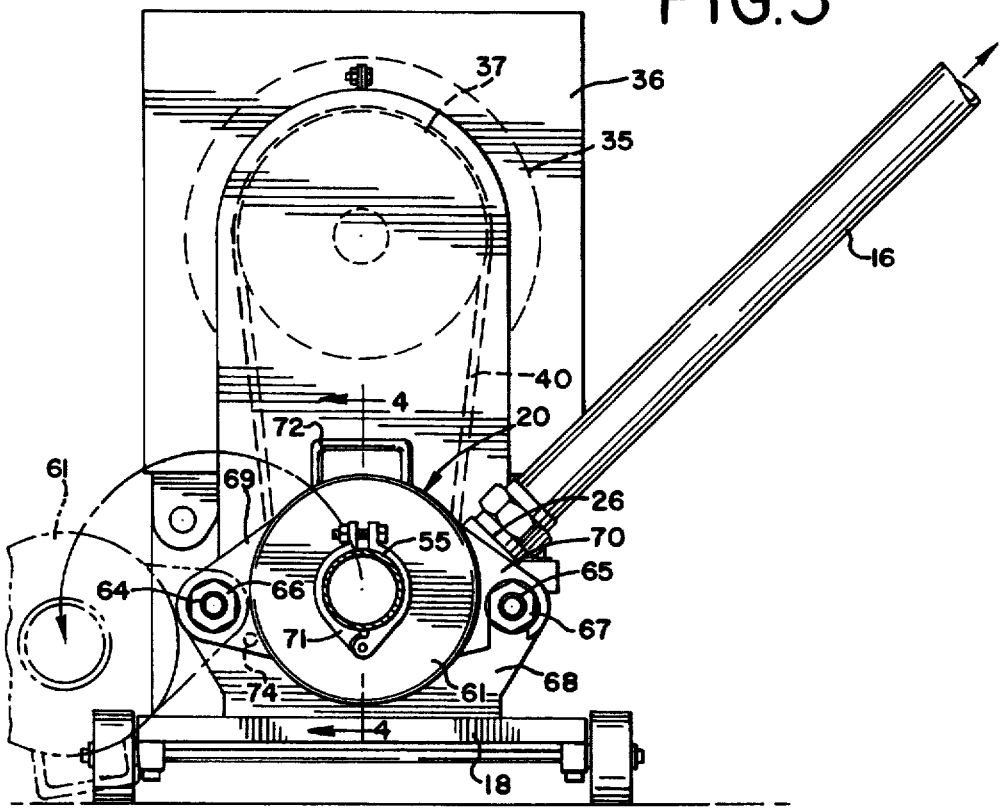
FIG. 3 is a side elevational view of the illustrated emulsifier, taken in the plane of line 3—3 of FIG. 2.

As shown in FIGS. 2 and 3, a sensing rod 74 is biased against the ear 69 by a coil spring 75. When the two housing sections 60 and 61 are in fully assembled relation, the push rod 74 is depressed rearwardly by the ear 69 and closes a safety switch 76 (FIG. 2) which is in the energizing circuit of the motor 35 of the mill 15. When the upstream housing section 61 is pulled away from the downstream housing section 60, the ear permits the sensing rod 74 to move to a position opening the switch 76 so as to disable the motor 35 and prevent the mill from being operated when the housing section 61 is in a position other than its fully closed position.

Figure 12:
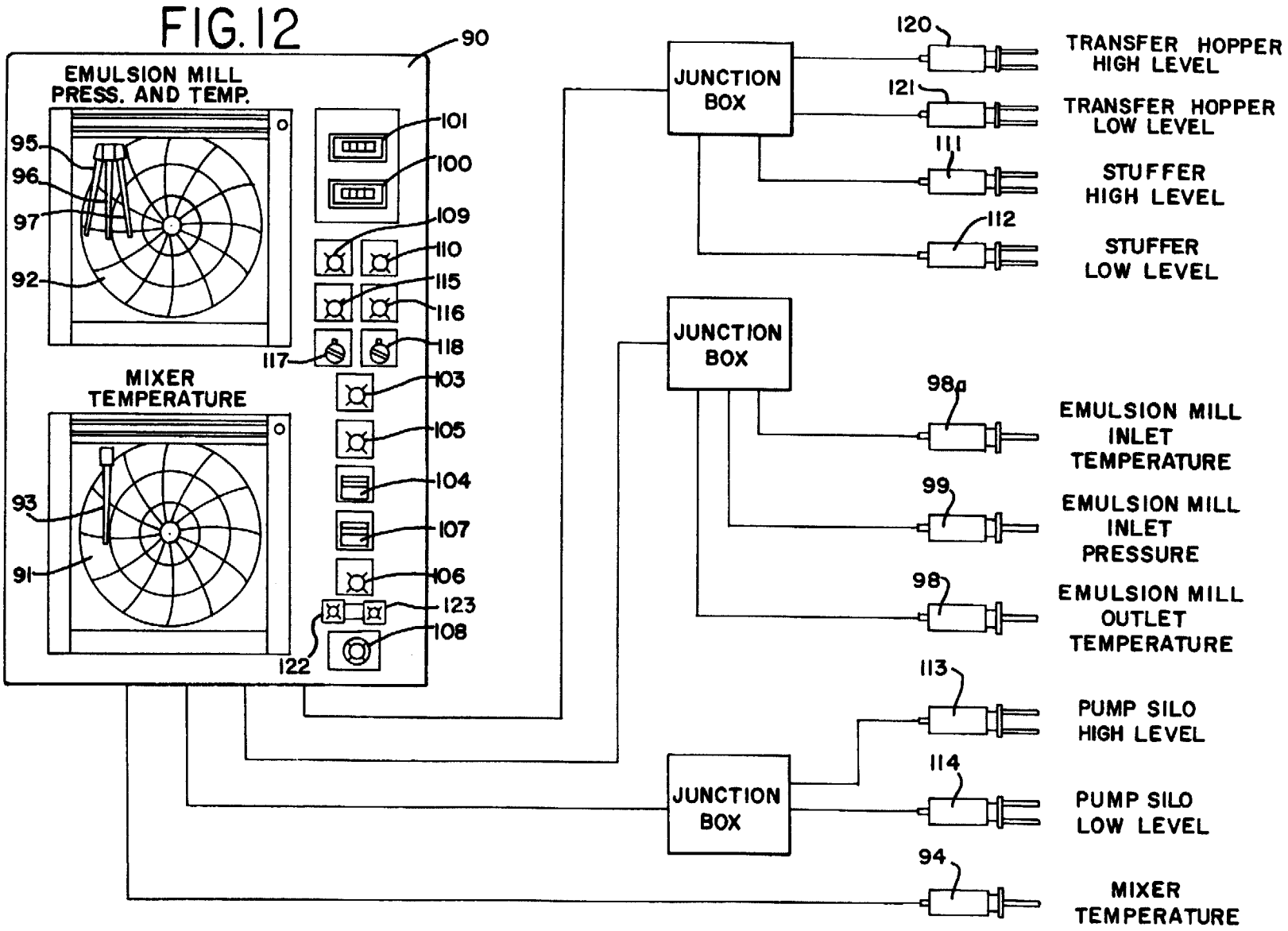
FIG. 12 is a schematic diagram of the controls for the illustrated meat process system shown in FIG. 1.

In accordance with still a further aspect of the invention, the illustrated emulsification system is adapted for relatively precise control, for more reliably producing a quality emulsified product with optimum emulsion stability. The control for the illustrated system is schematically shown in FIG. 12. Briefly, the system includes a control panel 90 with two 24 hour strip chart recorders 91 and 92. The recorder 91 includes a marker 93 which plots the temperature of the product in the mixer 10 as a function of time, such temperature being detected and signaled by a thermalcouple probe 94. The recorder 92 includes three markers 95, 96 and 97 which respectively plot, in different colors, the temperature of the product at the inlet 56 of the mill 15; the temperature of the product at the outlet 26 of the mill; and the pressure existing at the inlet of the mill. The inlet and outlet temperatures are detected and signaled by thermal-couples 98a and 98, respectively, while the inlet pressure is signaled by a pressure transducer probe 99. Digital read-outs 100 and 101 on the control panel 90 display the inlet and outlet temperatures, respectively, and may be used in setting the speed of the pump 52 to maintain an appropriate temperature differential in the product as the product is processed through the mill. An indicating light 103 on the control panel is energized when the transducer 99 signals that there is positive working pressure at the inlet of the mill.

The control panel 90 further comprises a "cycle on" switch 104, a "cycle on" indicating light 105, a "power on" light 106, a "cycle off" switch 107 and an emergency stop button 108. Additional lights 109 and 110 on the control panel 90 respond to conductivity transducers 111 and 112, respectively, which detect and signal when the level of product in the stuffer 17 is high or low. The level of the product in the supply silo 13 is detected by similar high and low level sensors 113 and 114 which energize warning lights 115 and 116, respectively, if there is either too much or too little product in the silo. The level of the product in the transfer hopper 11 also may be detected by high and low load lever sensors 120 and 121 which energize appropriate warning lights 122, 123.

The control panel 90 in this instance is completed by a pair of two-position selector switches 117 and 118. When the switch 117 is in the one position, both the mill motor 35 and the pump motor 53 are conditioned for operation so as to permit the system to function in a normal manner. In the other position of the switch 117, the mill motor 35 is disabled but the pump motor 53 is permitted to operate in order to prime the mill 17 preparatory to start-up of the overall system.

The switch 118 has a "manual mode" position and an "automatic mode" position. When the switch 118 is in its "manual" position, the system is started and stopped by actuating the "cycle on" switch 104 and the "cycle off" switch 107, respectively. If the switch 118 is in its "automatic" position, the mill is initially started by actuating the "cycle on" switch 104 but then is shut down automatically by the high level sensor 111 of the stuffer 17 and is restarted automatically by the low level sensor 112 of the stuffer.

Appropriate controls preferably are provided for preventing operation of the rotary cutter until a predetermined positive pressure is sensed by the pressure sensor 99 on the inlet side of the cutter. During operation of the mill, as previously described, the emulsification temperature increase can be controlled to the desired amount by controlling the speed of the variable speed positive displacement pump. It will be understood that this may be manually accomplished, or alternatively, an appropriate automated control can be provided which controls the speed of the pump as a function of the emulsion temperature differential between inlet and outlet.

From the foregoing, therefore, it can be seen that the emulsification system of the present invention can be operated to more thoroughly and efficiently emulsify meat by products with optimum emulsion stability. The system permits the use of smaller diameter perforations in the cutting plate and greater numbers of blade carrying arms on the rotary cutter for effecting finer and more thorough emulsification, while still permitting relatively precise temperature control.

I claim as my invention:

1. A meat emulsifying and processing system including a variable speed positive displacement pump having an inlet adapted to receive a supply of pre-cut meat and an outlet to deliver said pre-cut meat under pressure;

speed control means associated with said pump for selectively increasing and reducing the speed of said pump during operation based upon a temperature differential of the meat being emulsified to thereby vary the rate of flow of meat from said pump;

an emulsifying mill for breaking said pre-cut meat into a fine emulsion, said mill including a housing, an inlet adapted to receive said pre-cut meat from said pump, an outlet downstream from said inlet,

[a perforated plate connected to said housing between said inlet and outlet,]

a rotary [cutter, adjacent and upstream of said perforated plate, said cutter adapted to force said pre-cut meat through said perforated plate,] *cutter located between said inlet and said outlet,* a rotary impeller disposed within said housing downstream of said [perforated plate] *rotary cutter* adapted to convey emulsified product out of said outlet, and drive means for rotating said cutter;

first temperature sensing means associated with said inlet of said emulsifier to detect the temperature of said meat at said inlet;

first display means for displaying the temperature of said meat at said inlet;

second temperature sensing means associated with said outlet of said emulsifier to detect the temperature of said emulsion at said outlet;

second display means for displaying the temperature of said emulsion at said outlet, said temperature sensing means and said display means operative to enable a processing system operator to compare the temperature differential between said first and second temperature sensing means and, when said temperature differential deviates from a predetermined value, to activate said speed control means to vary the speed of said pump to thereby control the temperature rise of said meat during emulsification.

2. A meat emulsifying and processing system as in claim 1 including automated control means associated with said first and second temperature sensing means and said speed control means operable when said temperature differential deviates from a predetermined value to signal said speed control means to vary the speed of said pump to thereby control the temperature rise of said meat during emulsification.

3. A meat emulsifying and processing system as in claim 2 in which said automated control means is operative to signal the speed control means to increase the speed of said pump when said temperature differential exceeds a predetermined value and to decrease the speed of the pump when said temperature differential falls below a predetermined value.

4. A meat emulsifying and processing system as in claim 1 including pressure sensing means positioned adjacent said inlet of said emulsifying mill adapted to sense the inlet pressure of said mill, said pressure sensing means connected to said drive means such that said drive means is activated only after a pressure above a predetermined value is sensed at said inlet of said emulsifying mill.

5. A meat emulsifying and processing system as in claim 4, in which said drive means is deactivated when said inlet pressure of said emulsifying mill drops below a predetermined value.

*6. A meat emulsifying and processing system as in claim*

*1 including a perforated plate connected to said housing and adjacent to and downstream of said rotary cutter, said rotary cutter adapted to force said pre-cut means through said perforated plate.*

* * * * *

UNITED STATES PATENT AND TRADEMARK OFFICE

CERTIFICATE OF CORRECTION

PATENT NO. : Re. 35,048

DATED : October 3, 1995

INVENTOR(S) : C. Richard Rudibaugh

It is certified that error appears in the above-indentified patent and that said Letters Patent is hereby corrected as shown below:

Claim 6, column 12, line 3, change the italicized word "means" to the italicized word -- meat --.

Signed and Sealed this

Twenty-seventh Day of February, 1996

*Attest:*

Bruce Lehman

BRUCE LEHMAN

*Attesting Officer*

*Commissioner of Patents and Trademarks*